United States Patent [19]

Broder et al.

[11] 4,162,474

[45] Jul. 24, 1979

[54] YAW-COMPENSATED CORRELATING SONAR TRACKING SYSTEM

[75] Inventors: Alan Broder, Albertson; Paul Shapiro, Brooklyn; Seening Yee, Whitestone, all of N.Y.

[73] Assignee: Sperry Rand Corporation, New York, N.Y.

[21] Appl. No.: 398,486

[22] Filed: Sep. 21, 1964

[51] Int. Cl.² .............................................. G01S 3/80
[52] U.S. Cl. ............................ 340/6 R; 343/100 CL; 343/113 R
[58] Field of Search .................. 343/5 ST, 100.7, 113, 343/114, 114.5, 100.6, 100 CL, 113 R; 340/6, 16, 6 R, 16 R

[56] References Cited

U.S. PATENT DOCUMENTS

3,852,706  12/1974  Barney et al. ........................ 340/6 R

Primary Examiner—Richard A. Farley
Attorney, Agent, or Firm—Howard P. Terry

EXEMPLARY CLAIM

1. Apparatus comprising
a pair of signal sensors spacially displaced from each other,
means connected to each sensor for quantizing the signals at the output thereof,
first and second two-mode reversing switches, each switch having two inputs respectively connected to two outputs in one mode and having said two inputs inversely connected to said two outputs in the other mode,
each quantized signal being applied to a respective input of said first switch,
one output of said first switch being connected to one input of said second switch,
variable delay means connected between the other output of said first switch and the other input of said second switch,
means for controlling the delay of said variable delay means and the modes of said first and second switches,
a signal correlator connected to the outputs of said second switch to produce an output signal representing the correlation function of the signals at the outputs of said second switch,
and signal integrating means responsive to said output signals.

9 Claims, 3 Drawing Figures

YAW-COMPENSATED CORRELATING SONAR TRACKING SYSTEM

The present invention generally relates to sonar target angular tracking systems employing signal correlation, and, more particularly, to a system of such type adapted for the long time integration of correlated signals despite own ship's yaw.

As is well understood in the art, underwater sources of sound may be detected and their bearings deduced from the relative times of arrival of the sound at a pair of spaced directional receivers. The bearing or azimuth position of the sources relative to a line joining the two receivers is one of the factors which determine the times of arrival of the sound signals at the receivers. Of course, the relative bearing of the source depends not only upon the movement of the sound sources but also upon the movement, such as the yaw, of the vehicle carrying the receivers. Consequently, it is important that effects due to own ship's yaw be neutralized in order that the azimuth of the sound sources be ascertained accurately and with minimum effort.

Another desired characteristic of an underwater target detection system is the capability of distinguishing a distant sound source despite the presence of noise-like sounds originating in the vicinity of the receivers. Said noise-like sounds typically are caused by water turbulences attending the motion of the detecting vessel through the water. An effective solution to the problem of noise rejection is the use of signal correlation techniques in the target detection equipment. Noise rejection is substantially enhanced by long-time integration of the correlated signals. Long time integration, in turn, necessitates that stabilization be provided against rapid changes of target relative bearing such as due to own ship's yawing.

The principle object of the present invention is to provide a yaw correction in a sonar detection system using long time signal integration of correlated signals for the determination of sound source bearing.

Another object is to provide a 360° bearing tracking sonar system characterized by the ability to reject noise-like sound signals through the use of signal correlation techniques while being free from yaw-induced degradation in performance.

These and other objects of the present invention, as will appear from a reading of the following specification, are accomplished in a typical embodiment having a pair of phased hydrophone arrays located a fixed distance apart along the keel of a ship. The transducer elements of each array are phased and combined to produce pairs of overlapping beams, each beam pair being oriented along a respective azimuth relative to the line joining the two arrays. The signals received by a selected pair of beams of the phased arrays are quantized and sampled before being cross-correlated to determine the precise bearing of the signal source (target) within the directive beams of the arrays. A compensating delay is inserted in the signal data derived from the array having the shorter propagational path to the underwater sound source. The inserted delay is such that signals from a target on the crossover axis of the beams would be brought into time coincidence at the inputs to the signal correlator. The delay means is adapted for the rapid alteration of the delay magnitude in accordance with the amount of yaw experienced by the ship carrying the detection apparatus.

The quantized, sampled and suitably delayed signals are processed in a digitalized signal correlator to provide a correlogram of all signals received within the selected pair of directional beams provided by the phased arrays. The correlogram is produced by a multiplicity of integrated voltages, each of which represents a respective point on the correlogram. Noise-like signals and all other signals uncorrelated at the two receiving arrays are discriminated against as a function of the length of time during which the aforesaid voltages are integrated. Generally, the longer the integration time, the greater the discrimination against the noise-like signals. In accordance with the present invention, long integration time is made possible partly through the provision of the controllable delay which is adjusted in accordance with the yawing motion of the detection ship. Another important feature of the invention relevant to the realization of long integration time is its ability to track a sound source or target with the same tracking sense irrespective of the value of the target bearing angle at the time when own ship's yaw is occurring.

The integrated voltages are sampled in time sequence to produce a display similar in appearance to the well known type "A" cathode ray tube presentation except that the horizontal dimension of the display corresponds to the target bearing. An additional indicator also is provided to render a permanent record on a continuously moving paper roll from which the operator can determine target azimuth under signal to noise conditions below the detection capability of the first indicator.

For a more complete understanding of the present invention, reference should be had to the following specification and to the appended figures of which.

Figure 1A:
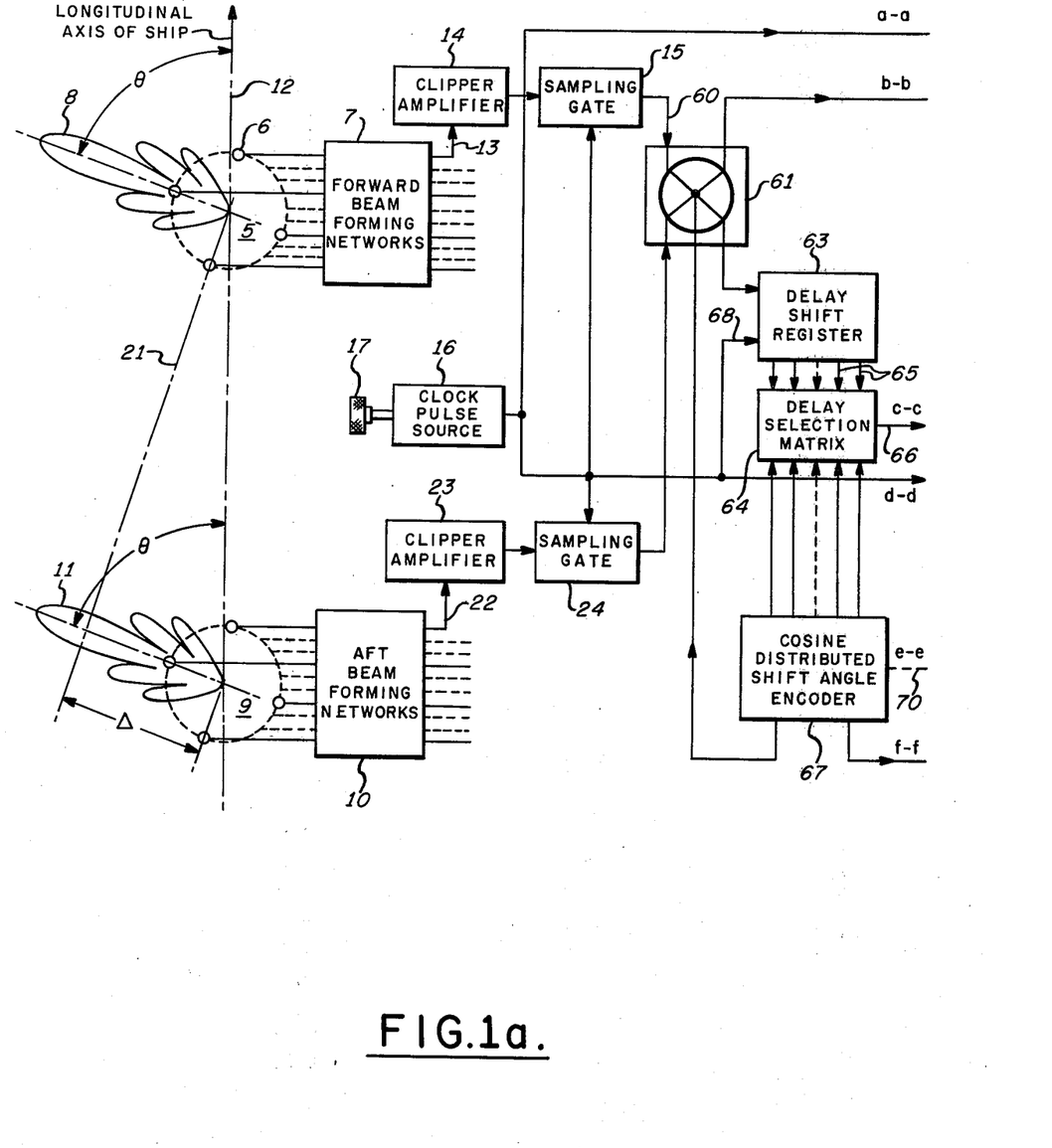
FIGS. 1A and 1B are simplified schematic diagrams of a typical embodiment of the present invention.
Figure 1B:
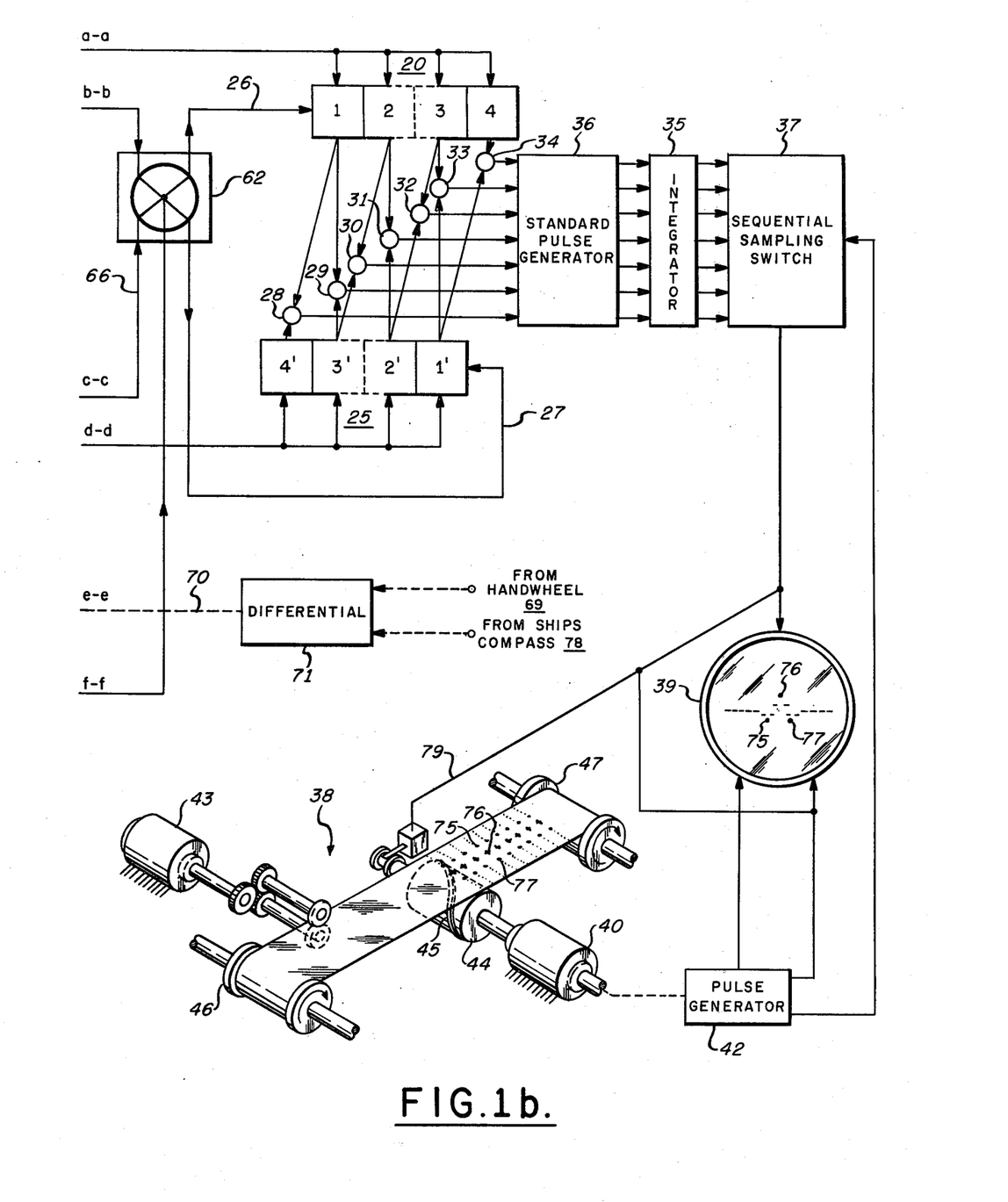

Referring to FIG. 1, forward hydrophone array 5 comprises a plurality of individual hydrophone elements 6 arranged in a circular configuration. In a representative case, 24 elements are employed in the array. The elements individually are connected to forward beam forming networks 7. Networks 7 include signal delay and signal combining circuits which produce, in a conventional manner, a plurality of directional beam patterns such as pattern 8. In one system, it was found convenient to provide 24 fixed directional beams, each beam being contiguous to the next and having an extent of 15° whereby the 24 beams covered a full 360°.

Aft hydrophone array 9 and aft beam forming networks 10 correspond in structure and function to forward array 5 and networks 7, respectively. Arrays 5 and 9 preferably are positioned along the longitudinal axis (keel) 12 of a ship with the centers of the arrays being displaced, by a distance, for example, of about 60 ft. The ability of the sonar detection system to discriminate in favor of distant sound sources to the exclusion of nearby sources of noise-like signals (water turbulence due to ships motion) is enhanced by providing a large separation between the arrays. Of the plurality of contiguous directional beams provided by the arrays and beam forming networks, only two beams 8 and 11 are shown in the drawing by use of example. Beams 8 and 11 correspond to each other in the sense that each is directed along the same angle $\theta$ relative to the longitudinal axis 12 of the ship. It will be understood that the remaining beams (not shown) provided by the arrays and beam forming networks form corresponding pairs similar to beam pairs 8 and 11 but oriented at different respective angles θ relative to axis 12.

Each pair of corresponding beams such as beams 8 and 11 receive signals emanating from an underwater sound source (not shown) which lies within the angular extent covered by the beams. Signals received within beam 8 are applied by line 13 to clipper amplifier 14 wherein the signals are amplified and clipped and thus binary quantized into a train of fixed amplitude but varying duration square wave signals having zero crossing points corresponding to the zero crossing points of the received signals. The quantized signals are applied to sampling gate 15 which is rendered conductive upon each occurrence of the sampling pulses provided by clock pulse source 16. The repetition rate of the clock pulses may be varied by the manual adjusting of control knob 17. The quantized signals applied to gate 15 are sampled by the pulses of source 16 to produce a series of binary pulses at the output of gate 15 which is uniquely characteristic of the quantized signal function.

The sampled quantized pulses from gate 15 on line 60 are applied to reversing switch 61. Depending upon the condition of switch 61, the pulses on line 60 are applied either directly to reversing switch 62 or indirectly to switch 62 via delay shift register 63 and delay selection matrix 64. Delay shift register 63 comprises a conventional shifting register having a plurality of outputs 65 at the respective stages thereof. Delay selection matrix 64 connects one of the outputs 65 to line 66 in accordance with the value of the number represented by digital signals derived from shaft angle encoder 67. Matrix 64 may be a straightforward diode selection matrix such as the one disclosed in "Digital Computer Components and Circuits" by R. K. Richards, D. Van Nostrand Co. 1957, page 57, FIG. 2-12(b). By changing the value of the number represented by the digital signals from encoder 67, matrix 64 selects a different tap of register 63, thereby effectively changing the length of register 63 (in increments of the clock pulse repetition interval) and the delay suffered by the sampled quantized data signals propagating through it. It should also be noted that the effective delay of signals passing through register 63 also may be varied by changing the repetition rate of the shifting pulses derived from source 16 and applied via line 68. It will be seen that signals from an underwater sound source located along the axis of directional beams 8 and 11 travel different path lengths in reaching the respective arrays 5 and 9. The difference in path lengths is represented by the distance Δ which is the separation between the center of array 9 and the perpendicular 21 drawn from the center of array 5 to the axis of beam 11. The signal delay introduced by register 63 is made equal in time to the propagational delay experienced by the received signals in traversing the distance Δ. The required delay is inserted by the operator adjustment of handwheel 69 which drives encoder shaft 70 via mechanical differential 71.

Signals received in beam 11 are applied via line 22, clipper amplifier 23 and sampling gate 24 to a second input of reversing switch 61 in a manner equivalent to that described in connection with amplifier 14 and gate 15. Thus, signals emanating from a sound source located along the directive axes of beams 8 and 11 are binary quantized, sampled and then applied to respective inputs of reversing switch 61. One of the applied signals is directly routed by switch 61 to reversing switch 62 whereas the other signal is directed by switch 61 through register 63 and matrix 64 to the other input of reversing switch 62. As will be seen later, switch 61 is operated each time that the relative bearing of the underwater sound source passes through 90° and 270° whereas switch 62 is operated each time that the target relative bearing passes through 0° or 180°. The signals at the outputs of reversing switch 62 are applied to input stages 1 and 1', of shifting registers 20 and 25, respectively.

Registers 20 and 25 are the input elements of a polarity-coincidence signal correlator responsive to the binary quantized and sampled input signals to provide a plurality of output voltages representing respective points on the correlogram of the signals at the outputs of reversing switch 62. A suitable correlator is described in detail in the paper "Implementation of the Correlation Process in the Manner of a Parallel Digital Computer" by R. W. Boyell and Charles W. Olson, IRE International Convention Record, Volume 9, Part 9, page 219 (1961). Briefly, the signal correlogram is produced by making simultaneous polarity comparisons between respective phase shifted pairs of the signals on lines 26 and 27 and then integrating the results of the comparisons. If, for example, the sound source is located along the axes of directional beams 8 and 11, a correlogram maximum results from the polarity coincidence comparison of a non-phase shifted pair of quantized signals. If, on the other hand, the sources located within the beams 8 and 11 but off the axes thereof, a correlogram maximum is produced by the polarity coincidence comparison of phase shifted versions of the signals on lines 26 and 27. The amount of phase shift necessary to provide a correlogram maximum is proportional to the angular deviation of the underwater sound source from the directional axes of beams 8 and 11. In the operation of the present invention, suitable delay is introduced in one of the sampled quantized signals prior to signal correlation (with the aid of handwheel 69, differential 71, encoder 67, matrix 64 and register 63) so that the signals on reaching lines 26 and 27 at the inputs to the signal correlator are substantially in time phase. The indications which guide the operator in determining the proper setting of handwheel 69 will be discussed later.

The stages comprising registers 20 and 25 are connected to coincidence detectors 28, 29, 30, 31, 32, 33 and 34. Each detector is arranged to provide an output signal when its two input signals agree in polarity and to produce no output signal otherwise. Accordingly, if the outputs of registers 20 and 25 to which a particular coincidence detector is connected are in the same state (either both "1" or both "0") then an output is produced by the coincidence detector. In the case where the signals are applied in time phase to stages 1 and 1' of registers 20 and 25, respectively, the signals are shifted through the respective registers at the clock pulse rate (pulse rate from source 16) and reach stages 2 and 2' at the same time. Only coincidence detector 31 receives inputs from stages 2 and 2'; therefore, detector 31 alone will produce a maximum average output in the event that the signals are applied simultaneously to the respective registers 20 and 25. This condition persists so long as the operator continues to introduce the correct amount of time delay by positioning the handwheel 69.

Target bearing, of course, changes with the unpredictable maneuvering of the sound source being tracked. Consequently, there will exist momentarily the condition when a small error will exist in the setting of handwheel 69. That is, the time delay introduced will not be precisely the correct amount to cause the two sampled quantized signals to occur in time phase at the respective inputs to registers 20 and 25. In the event that too little time delay is introduced, the input to register 20, for example, may precede the input to register 25 by an amount equal to the period of the clock pulse from source 16. In the assumed event, the signals are shifted through stage 1 of register 20 to reach stage 2 at the same time that the signals on line 27 arrive at stage 1' of register 25. One clock pulse later, the signal in stage 2 is shifted to stage 3 and the signal in stage 1' is shifted to stage 2'. Coincidence detector 32 receives inputs from stages 3 and 2' so that detector 32 alone produces a maximum average output in the second assumed case. No detector other than detector 32 can produce an equivalent (maximum) output. To sum up, a maximum output from detector 31 indicates that the correct amount of time delay is being introduced by the operator whereas a maximum output from detector 32 indicates that the delay being introduced is in error in the sense that the signals at the input of register 20 precedes the signals at the input to register 25 by one clock pulse repetition interval. In the latter case, the operator repositions handwheel 69 to select a tap on register 63 adjacent to the tap previously used so as to bring the signals at the inputs to the correlator shift registers in time phase. When this is done, the bearing angle of the target being tracked is represented by the angular position of the handwheel. It will be seen that handwheel position actually represents the true bearing rather than the relative bearing of the target because of the input 78 to differential 71 from the ships compass.

Output shaft 70 of differential 71 drives a conventional shaft angle to digital signal converter 67. It is preferred that the digital representations produced by encoder 67 be "cosine distributed". That is, it is preferred that the value of the digital signals provided by the encoder vary in accordance with the cosine of the angular position of shaft 70 rather than in direct linear relationship therewith. The rate at which the values of the digital signals are caused to change in response to a given angular displacement of shaft 70 is smallest at 0° and 180° positions of shaft 70 and greatest at 90° and 270° settings. The need for a cosine encoder distribution is inherent in the geometry of the tracking system as may be seen by reference to FIG. 2. Sound emanating from target T reaches the center of receiving array 5 prior to reaching the center of receiving array 9 because of the shorter propagation path to array 5. The arrays are separated by the distance l along axis 12. The difference in the lengths of the propagation path (producing a time delay between the signals as received by the arrays) is represented by the distance designated tv wherein t represents the time delay between the arrival of the signals at arrays 5 and 9 and v represents the velocity of propagation of sound through the medium. The relative bearing angle of target T is represented by $\theta$. By inspection of the geometry, the following relationship can be seen $$\cos\theta = vt/l$$

Figure 2:
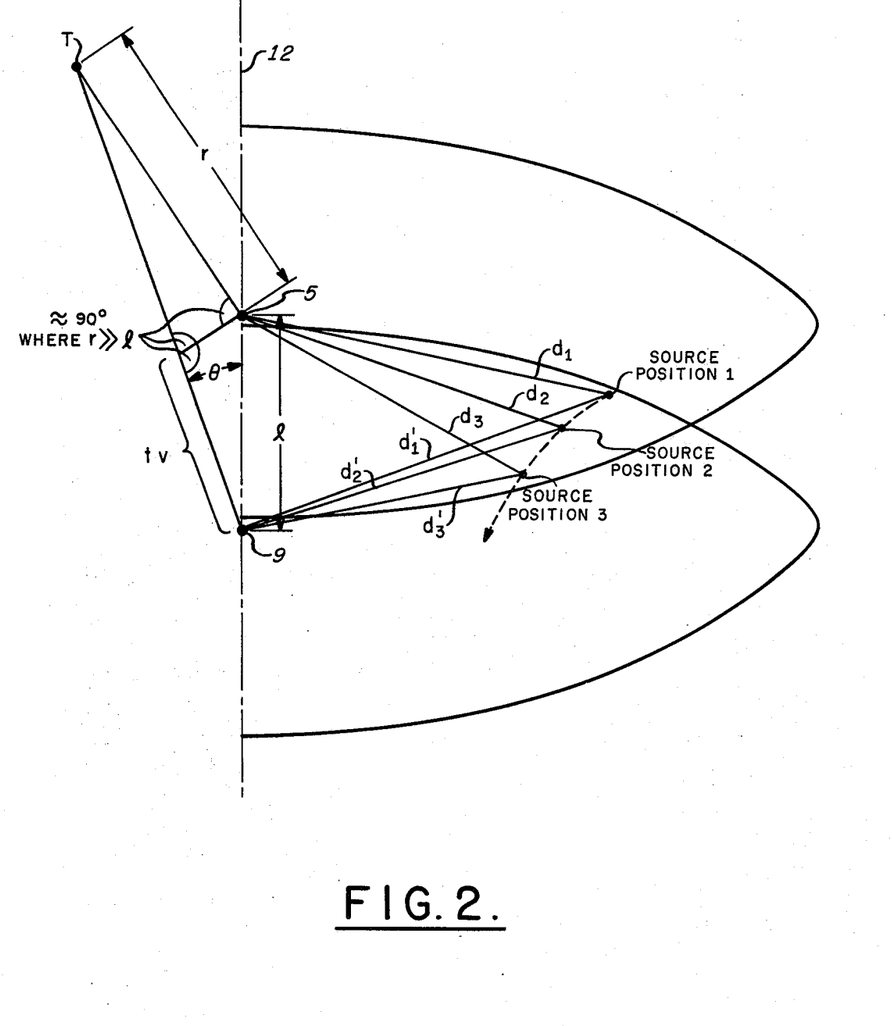
FIG. 2 is a sketch of target tracking geometry helpful in understanding the operation of the embodiment of FIG. 1.

The expression shows that the time delay t between the receptions of the signals at the two arrays is cosinusoidally related to the relative bearing angle of the target. Therefore, the delays introduced by the operator must be cosinusoidally related to the angular position of shaft 70 (representing target relative bearing) so that the position of the handwheel accurately represents the true bearing angle of the target which is the desired output data.

Of course, if target bearing angle changes for a given setting of handwheel 69 so that the signals at the input of register 25 precede the signals at the input of register 20, it will be necessary to trim the setting of handwheel 69 in a sense opposite to the adjustment required in the previously discussed case wherein the signals at the input signal of register 20 were assumed to precede the signals to register 25. For example, if the signal on line 27 precedes the signal on line 26 by an amount equal to one repetition interval of the clock pulses from source 16, the signals are shifted from stage 1' to stage 2' at the same time that the corresponding signals are shifted into stage 1. One clock pulse period later, the respective signals are shifted into stages 2 and 3' which are connected to coincidence detector 30. Therefore, coincidence detector 30 provides a maximum average output to the exclusion of the other detectors in the event that the signals on line 27 precede the signals on line 26 by a period equal to one clock pulse repetition interval. By similar reasoning, it can be seen that coincidence detector 29 provides a maximum output when the signals on line 27 precede the signals on lines 26 by a period equal to two clock pulse repetition intervals and so on.

A total of seven signal comparisons are made simultaneously by detectors 28 through 34 as the sampled quantized signals simultaneously are shifted through registers 20 and 25 at the clock pulse repetition rate. A maximum average output will be produced by only one of said detectors for a given time phase relationship between the signals at the inputs to registers 20 and 25. It should be observed that although four stages are shown in the shifting registers 20 and 25, a large number may be provided where increased angular resolution of target position is desired. In typical instrumentations, the number of stages employed in each of the shifting registers 20 and 25 is as high as fifty. The additional stages (not shown) are suggested by the dotted lines between stages 2 and 3 and between stages 2' and 3'.

The pulses appearing at the outputs of each of the coincident detectors 28–34 are summed by individual signal integrators 35. Each of the integrators 35 is coupled to a respective coincident detector via one of the standard pulse generators 36. The purpose of generators 36 is to standardize the outputs from the coincident detectors to remove spurious amplitude variations. Each of the integrators 35 may comprise a conventional resistance-capacitance integrating circuit whose output is sampled by sequential sampling switch 37 for application to target bearing indicators 38 and 39. It should be noted that although the voltages provided by the integrators are sampled sequentially, there is no loss of data inasmuch as the integrators continuously receive and store target bearing data.

Two types of bearing indicators are provided in the preferred embodiment. Indicator 39 is a cathode ray tube device having a horizontal sweep synchronized with the operation of the sequential sampling switch 37. The synchronization is achieved by means of pulse generator 42 which provides a first output for stepping the sampling switch 37 and a second output for triggering the horizontal sweep generator of indicator 39. Pulse generator 42 provides a sweep trigger each time that switch 37 is stepped to sample the integrator associated with coincidence detector 28. As previously discussed, detector 31 provides a maximum output in the event that the sampled quantized signals are in the time phase at the respective inputs to shifting registers 20 and 25 which is the result of proper adjustment of handwheel 69.

The integrated signals sequentially sampled by switch 37 are applied to the deflection means orthogonal to the sweep deflection means of scope 39. A maximum deflection is produced at a position along the sweep axis when switch 37 samples the integrator storing the maximum voltage. When handwheel 69 is properly positioned, the maximum deflection will occur at the midpoint of the scope sweep. The accurate adjustment of handwheel 69 may be facilitated by superimposing fiducial markers on the scope trace, such as, for example, by intensity modulating the scope beam to produce the three intensifications 75, 76, and 77. Said intensifications preferably may be produced by three successive pulses from generator 42. Intensification 76 is produced by a pulse occurring at the moment that switch 37 is sampling the integrator associated with coincidence detector 31. Intensifications 75 and 77 are produced by pulses from generator 42 immediately preceding and succeeding, respectively, the pulse producing intensification 76. To sum up, generator 42 preferably is designed in accordance with straight-forward techniques to provide three outputs. One output is a series of pulses for stepping switch 37. Another output occurs each time that switch 37 samples the integrator associated with coincidence detector 28. The third output from generator 42 is a sequence of three pulses, the center pulse of which is coincident with the pulse which causes switch 37 to sample the integrated output of detector 31. The latter three pulses are applied to intensity modulate the beam of scope 39. When properly adjusted, the center intensification 76 is superimposed on the peak excursion of the correlogram whereas intensifications 75 and 76 are symmetrically displaced about the peak on the correlogram. The relative bearing of the target then is represented by the angular position of handwheel 69 and may be read by a suitable indicator (not shown) driven by the handwheel.

It will be appreciated by those skilled in the art that long time integration of the voltages at the outputs of the coincident detectors 28–34 enhances the capability of detecting targets under poor signal-to-noise conditions. On the other hand, relatively short integration time would have to be used in the event that the sampled quantized data signals on lines 26 and 27 were to continuously shift in time phase due to the yawing motion of the tracking vessel. In accordance with the present invention, provision is made for eliminating the effects of own ship's yaw through the addition of the ship's compass input to differential 71. The introduction of yaw correction is entirely compatible with and is facilitated by the embodiment of FIG. 1. The ship's compass input 78 is combined with the setting of handwheel 69 to control the position of shaft 70 of encoder 67. Thus, the selection of the tap on delay shift register 63 is determined jointly by the setting of handwheel 69 and by the yawing motion of own ship. The result is that the sampled quantized data signals at the inputs to shifting registers 20 and 25 remain fixed in time phase with each other for a given target bearing angle irrespective of own ship's yaw to permit the use of long integration times in integrators 35.

As is well understood, signal integration is achieved on the face of a cathode ray tube as the result of superimposing a multiplicity of indications. However, the integration is not complete in that only a limited number of successive sweeps contribute to the visible indication. The more complete integration afforded by a permanent record of indications would enhance the capability of detecting targets under poor signal-to-noise conditions. A permanent record of all sampling provided by switch 37 is displayed by recorder 38. Recorder 38 essentially comprises a supply roll 46 and a pick-up roll 47 for transporting voltage sensitive paper at a convenient rate. The rate is chosen so that driving motor 43 transports the paper at a relatively slow speed whereby tracings representing a plurality of complete sampling cycles are superimposed. The transverse scanning of the paper is achieved through the use of synchronous motor 40 which drives drum 44 at a rate synchronized to the operation of sequential sampling switch 37. Synchronization is achieved through pulse generator 42 which may be a three track magnetic disk rotated by motor 40 to produce the three pulse outputs previously described, one of which drives switch 37. Drum 44 carries a raised helical strip 45 making contact with the paper at only one point. The point of contact between strip 45 and the paper continuously changes with the rotation of drum 44 so that the point of contact transversely scans the paper synchronously with the sampling or scanning of the signal outputs from integrator 35. Specifically, the contact point is at the center of the paper at the time that the integrated output of coincidence detector 31 is being sampled by switch 37. The three successive pulses from generator 42 (which produce the intensifications 75, 76, and 77 in the display of indicator 39) also are applied to input line 79 of indicator 38. Typical indications corresponding to the display of indicator 39 are shown on the tape.

The indication provided by scope 39 results from only a small finite number (the most recent) of the correlograms depicted in the record of indicator 38. In extremely poor signal-to-noise conditions, an operator can visually integrate all of the correlograms recorded on the paper to discern the azimuth of a target which is not apparent from the display provided by scope The accuracy with which off-beam target bearings can be determined depends in part upon the velocity of sound propagation through the medium (water). Consequently, compensation must be made for changes in the propagational velocity in order to maintain bearing accuracy. An important feature of the disclosed embodiment is the ease with which sound propagational velocity changes may be taken into account. Water temperature is a principal factor in determining sound propagational velocity. By monitoring the water temperature, for example, the operator may readily determine the propagational velocity and vary the effective electrical delay introduced by delay shift register 63 accordingly. Register 63 introduces a delay in the appropriate sampled quantized signal not only under the control of handwheel 69 but also as a function of the repetition interval of the clock pulses derived from source 16. Varying the clock pulse interval varies the effective delay introduced by register 63. The ease with which sound propagational velocity correction may be introduced is a consequence of the utilization of the digital signal correlator in the disclosed embodiment.

It can be shown that the sampling rate for the received data signals should be between two to three times the frequency of the highest frequency component of the data signal. Inasmuch as the clock pulses are applied jointly to the sampling gates 15 and 24 and to the delay register 63, changes in clock pulse frequency to compensate for changes in sound propagational velocity also effects the data signal sampling rates. However, the slight adjustments required from time to time in the clock pulse rate for velocity correction will not detract from the fidelity with which the signals at the output of the sampling gates represents the data signals as received by arrays 5 and 9.

The long integration time which permits the enhanced performance of the present invention under adverse signal-to-noise conditions is achieved principally by the provision of means for eliminating effects of own ship's yaw. The task is somewhat more complicated when the yawing motion of the tracking ship causes the relative bearing of the target being tracked to vary about any one of the four relative bearing quadrant boundaries, namely, 0°, 90°, 180°, and 270°. As shown in FIG. 2, when the relative bearing position of the sound source is changing (due to tracking ship yawing) from position 1 through position 2 to position 3, the sense of the time delay difference between the signals received by the forward and aft arrays inverts. At position 1, the distance $d_1$ between the source and the forward beam is less than the distance $d_1'$ between the source and the aft array. When the target is directly on the ship's beam, of course, the two distances $d_2$ and $d_2'$ are equal to each other. At position 3, the distance $d_3$ to the forward array is greater than the distance $d_3'$ to the aft array. As a consequence, the delay of shift-register 63 must be inserted in the forward beam signals when the target bearing lies in the first quadrant (between 0° and 90°) and must be removed therefrom and inserted into the aft beam signals as the target bearing crosses into the next quadrant (between 90° and 180°). Analogous switching of the delay shift register 63 from one to the other of the sampled quantized signals is required also when the target bearing traverses the quadrant boundary at 270°. There is no requirement that the delay shift register 63 be switched when the relative bearing quadrant boundaries of 0° and 180° are traversed inasmuch as the sense of the difference between the propagational path lengths does not invert at such times.

Delay shift register 63 is inserted into the proper signal path by the action of reversing switch 61. Switch 61 is controlled by a separate output from encoder 67 which output occurs each time that shaft 70 of encoder 67 traverses 90° or 270° relative bearing. In one setting of switch 61, the output signals from gate 15 are directly applied to reversing switch 62 whereas the output signals from gate 24 are applied to switch 62 via delay shift register 63. In the other setting of switch 61, the connections between gates 15 and 24 and the input to switch 62 are reversed.

Yet another yaw-aggravated effect occurs each time that the target relative bearing cross the quadrant boundaries at 0° and 180°. In such cases, the sense of the difference between the reception times of the signals at arrays 5 and 9 do not invert but the sense in which the displayed correlograms are caused to move for a given rotation of handwheel 69 reverses. An operator might experience, for example, that a clockwise rotation of the handwheel 69 is required to correct for a correlogram displacement to the left of display center when the relative target bearing is, say, 350°. The operator correspondingly would notice that a counterclockwise (opposite) rotation of handwheel 69 would be required to make the same apparent adjustment of the displayed correlogram when the relative target bearing is, say, 10°. Thus, the correlogram display would respond in opposite sense to a given rotation of the handwheel for target bearing angles on opposite sides of the zero relative bearing line. The same effect would be observed for target bearing positions on opposite sides of the 180° relative bearing line. The operator confusion consequent to the apparent sense reversal of the correlogram response to handwheel rotation would be seriously increased in the event that the target relative bearing were caused quickly to move from one side to the other of the 0° or 180° relative bearing line due to own ship's yaw.

The above-described undesired effects are wholly avoided in the present invention by the provision of reversing switch 62 which responds to the position of shaft 70 and, hence, to the ship's compass input 78 (representing own ship's yaw). Switch 62 receives an output from shaft angle encoder 67 similar to that applied to switch 61 except that the former output occurs each time that the angular settings of shaft 70 traverses either the 0° or 180° relative bearing position. The effect of each actuation of reversing switch 62 is to interchange the application of the sampled quantized signals to the respective registers 20 and 25 of the signal correlator whereby the sense of the signal correlation is reversed. The result is that for a given direction of displacement of the displayed correlogram peak from center display position, the operator always can turn handwheel 69 in the same known direction for correction irrespective of the quadrant in which the target lies. Thus, operator confusion is eliminated and the bearing of the target may be tracked and ascertained with unimpeded facility.

To simplify the explanation of the preferred embodiment, the signal correlator was shown responding only to the pair of beams 8 and 11 of the forward and aft arrays 8 and 9. It will be recalled, however, that a multiplicity of directional beams are provided by each of the arrays 5 and 9 and the respective beam forming networks 7 and 10. It will be understood that beams 8 and 11 and all the other beams are stationary relative to the axis 12 of the tracking ship. Consequently, a target whose azimuth is changing must be tracked by switching between adjacent corresponding beam pairs in accordance with the target bearing angle. Beam pair switching can be accomplished by straightforward selection techniques whereby the particular beam pair to be utilized (suggested by the dotted line outputs from networks 7 and 10) are selected in accordance with the setting of shaft 70. Alternatively, individual rotatable directional beams could be employed in lieu of stationary arrays 5 and 9 whereby the position of each of the rotatable directional beams is determined in direct relationship to the angular position of shaft 70.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. Apparatus comprising
    a pair of signal sensors spacially displaced from each other, means connected to each sensor for quantizing the signals at the output thereof, first and second two-mode reversing switches, each switch having two inputs respectively connected to two outputs in one mode and having said two inputs inversely connected to said two outputs in the other mode, each quantized signal being applied to a respective input of said first switch, one output of said first switch being connected to one input of said second switch, variable delay means connected between the other output of said first switch and the other input of said second switch, means for controlling the delay of said variable delay means and the modes of said first and second switches, a signal correlator connected to the outputs of said second switch to produce an output signal representing the correlation function of the signals at the outputs of said second switch, and signal integrating means responsive to said output signals.

2. Apparatus comprising a pair of directional signal sensors spacially displaced from each other along a line, the directional axes of said sensors being positioned at the same angle relative to said line, means connected to each sensor for quantizing the signals at the output thereof, first and second two-mode reversing switches, each switch having two inputs respectively connected to two outputs in one mode and having said two inputs inversely connected to said two outputs in the other mode, each quantized signal being applied to a respective input of said first switch, one output of said first switch being connected to one input of said second switch, variable delay means connected between the other output of said first switch and the other input of said second switch, means for jointly controlling the delay of said variable delay means and the modes of said first and second switches, a shift register signal correlator connected to the outputs of said second switch to produce a multiplicity of output signals representing respective points comprising the correlation function of the signals at the outputs of said second switch, and signal integrating means responsive to said output signals.

3. Apparatus as defined in claim 2 wherein said variable delay means comprises a shifting register having a tap at each stage thereof, and said means for controlling the delay of said variable delay means is operative to select one of said taps.

4. Apparatus comprising a pair of signal sensors spacially separated from each other along a line, means connected to each sensor for quantizing the signals at the output thereof, signal sampling means connected to said quantizing means for sampling each quantized signal in response to repetitive clock pulses, a source of said repetitive clock pulses coupled to said sampling means, first and second two-mode reversing switches, each switch having two inputs respectively connected to two outputs in one mode and having said two inputs inversely connected to said two outputs in the other mode, each of the sampled signals at the output of said sampling means being applied to a respective input of said first switch, one output of said first switch being connected to one input of said second switch, variable delay means connected between the other output of said first switch and the other input of said second switch, means for jointly controlling the delay of said variable delay means and the modes of said first and second switches, a shift register signal correlator connected to said clock pulse source and to the outputs of said second switch to produce a multiplicity of output signals representing respective points comprising the correlation function of the signals at the outputs of said second switch, and signal integrating means responsive to said output signals.

5. Apparatus as defined in claim 4 wherein said variable delay means comprises a shift register having a tap at each stage thereof, said register being coupled to receive said clock pulses, and said means for controlling the delay of said variable delay means being operative to select one of said taps.

6. Apparatus as defined in claim 5 wherein said means for controlling the delay of said variable delay means comprising a delay selection matrix for selecting a tap of said shift register in accordance with the value of a number represented by digital signals, and a source of said digital signals for converting the angular displacement of a shaft into an equivalently valued number represented by said digital signal, the values of the numbers being cosinusoidally related to the displacement of said shaft.

7. Vehicle-borne apparatus for determining the relative bearing of a source of incoming signals, said apparatus comprising a pair of signal sensors spacially separated from each other, means connected to each sensor for quantizing the signals at the output thereof, first and second two-mode reversing switches, each switch having two inputs respectively connected to the two outputs in one mode and having said two inputs inversely connected to said two outputs in the other mode, each quantized signal being applied to a respective input of said first switch, one output of said first switch being connected to one input of said second switch, variable delay means connected between the other output of said first switch and the other input of said second switch, means for jointly controlling the delay of said variable delay means and the modes of said first and second switches in response to a control signal, means sensitive to the yawing motion of said vehicle for producing said control signal, said control signal being applied to said jointly controlling means, a signal correlator connected to the outputs of said second switch to produce an output signal representing the correlation function of the signals at the outputs of said second switch, and signal integrating means responsive to said output signals.

8. Vehicle-borne apparatus for determining the relative bearing of a source of incoming signals, said apparatus comprising a pair of directional sensors spacially displaced from each other along a line, the directional axis of said sensors being positioned at the same angle relative to said line, means connected to each sensor for quantizing the signals at the output thereof, first and second two-mode reversing switches, each switch having two inputs respectively connected to the two outputs in one mode and having said two inputs inversely connected to said two outputs in the other mode, each quantized signal being applied to a respective input of said first switch, one output of said first switch being connected to one input of said second switch, variable delay means connected between the other output of said first switch and the other input of said second switch, means for jointly controlling the delay of said variable delay means and the modes of said first and second switches in response to a control signal, means sensitive to the yawing motion of said vehicle for producing said control signal, said control signal being applied to said jointly controlling means, a shift register signal correlator connected to the outputs of said second switch to produce a multiplicity of output signals representing respective points comprising the correlation function of the signals at the outputs of said second switch, and signal integrating means responsive to said output signals.

9. Apparatus as defined in claim 8 wherein said signal integrating means includes means producing overlapping permanent records of said output signals produced by said signal correlator.

* * * * *